Patented Aug. 31, 1943

2,328,358

UNITED STATES PATENT OFFICE 2,328,358

ORGANIC COMPOUND AND PROCESS FOR PREPARING THE SAME

Josef Pikl, Pitman, N. J., assignor to E. I. du Pont de Nemours & Company, Wilmington, Del., a corporation of Delaware No Drawing. Application January 23, 1941, Serial No. 375,617

9 Claims. (Cl. 260—500)

This invention relates to novel organic compounds and to processes for making the same. More particularly this invention deals with the preparation of amino-methylene-phosphonic acid and N-substituted derivatives thereof, as well as salts of any of these.

It is an object of this invention to produce novel organic compounds which are characterzided by possessing in their molecule both an amino group and a phosphonate radical, the latter term being used as a generic expression for the phosphonic acid radical and its salts.

The novel compounds of this invention may be considered as derived all from the simplest member of the series: amino-methylene phosphonic acid, which may be represented by the formula

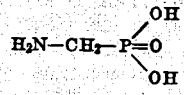

The remaining members of the series differ from this simple formula by having one of the hydrogen atoms of the $NH_2$ group replaced by an alkyl, aralkyl or aryl radical, or by having one or both hydrogen atoms of the phosphonic acid radical replaced by a suitable cation. The general series of novel compounds may therefore be represented by the formula

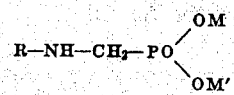

wherein R stands for hydrogen, alkyl, aralkyl or aryl, while M and M' stand for cationic substituents, for instance, hydrogen, sodium, potassium, calcium, magnesium, silver, mercury, ammonium, pyridinium, trimethylammonium, etc.

The term "alkyl" in this discussion is used as a generic term, including open-chain alkyl as well as cycloalkyl.

The novel compounds of this series are characterized by being concurrently acids and amines, and are therefore capable of the same reactions as the glycines and taurines. Accordingly, they have potential utility in all fields of organic synthesis wherein glycine ($NH_2$—$CH_2$—$COOH$) or taurine ($NH_2$—$CH_2$—$CH_2$—$SO_3H$) or the corresponding N-alkyl, N-aralkyl or N-aryl derivatives, have been used heretofore, for the production of analogous compounds. In particular, they may be arylated with chromophor-bearing aromatic compounds having a reactive halogen atom to produce dyestuffs, and they may be acylated with long-chain aliphatic acyl halides to produce water-repellency and softening agents.

According to this invention, I produce the novel compounds by subjecting to hydrolysis by the aid of mineral acid, for instance aqueous hydrochloric, sulfuric or phosphoric acid, an acylamido-methylene-phosphonic acid of the general formula

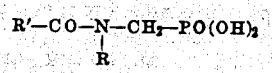

(or a salt thereof), or an N-carbomethoxy-amino-methylene phosphonic acid of the general formula

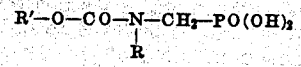

(or a salt thereof) wherein R and R' stand for alkyl, aralkyl or aryl radicals.

The hydrolysis is effected by heating said phosphonic acid compound with an aqueous solution of said mineral acid at a temperature above 50° C., preferably 70 to 100° C., for a prolonged period (12 hours or more) until the mass, which consisted originally of a white solid suspended in an aqueous phase, has changed to an oily phase and a homogeneous aqueous phase, and the oily phase no longer contains phosphorus.

The said initial materials are themselves products of recent invention and are more fully described and claimed in copending application of Engelmann and Pikl, Serial No. 322,766, filed March 7, 1940, and issued December 8, 1942, as Patent No. 2,304,156. Their synthesis is effected, in general terms, by reacting with a phosphorus trihalide upon the corresponding methylol amide of formula R'—CONH—$CH_2OH$ or

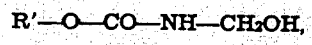

to produce an intermediate dihalogen phosphorus ester, which rearranges spontaneously into a phosphone-dihalide, and then hydrolyzing the latter to produce the phosphonic acid. The transformation in the case of the methylol amide, for instance, is expressed in the said copending application by the following series of equations:

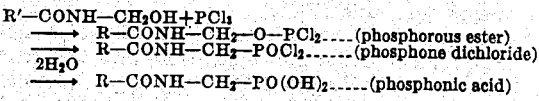

The salts of my novel compounds above, both normal and acid salts, may be prepared by neutralizing the corresponding phosphonic acids with one or two equivalents of a compound of basic reaction, for instance sodium-carbonate, sodium hydroxide, potassium carbonate, magnesium oxide, calcium oxide or hydroxide, ammonia, trimethylamine, pyridine, mercuric oxide, silver oxide or silver nitrate in the presence of a buffer; etc. Upon evaporation of the aqueous mass, the corresponding mono- or di-salts may be obtained in dry form. By using two different basic compounds for neutralization, mixed di-salts may be obtained.

Without limiting my invention to any particular procedure, the following examples are given to illustrate my preferred mode of operation. Parts mentioned are by weight.

*Example 1.—Amino-methylene-phosphonic acid*

100 parts of methylol stearamide were added gradually to a mixture of 45 parts of carbon tetrachloride and 91 parts of phosphorus trichloride. One hour after all the methylol amide had been added, 40 parts of acetic acid were added and the reaction mass was allowed to stand at room temperature for four days. The reaction mixture gradually became a viscous mass and at the same time soluble in dilute alkalies. The reaction mass which now contained probably the phosphone dichloride was treated with aqueous hydrochloric acid of 8% strength, at about 50° C. for two hours and yielded a crystalline, readily filterable, product which was then recrystallized from alcohol. The crystalline product melted to an opaque mass at about 108° C. but did not become completely homogeneous until heated to a much higher temperature. It was readily soluble in dilute alkalies and in hot water giving a viscous foaming solution. This product is believed to be stearamido-methyl phosphonic acid of the formula $$C_{17}H_{35}-CONH-CH_2-PO(OH)_2$$

67 parts of the last mentioned product were heated in 1700 parts of 5% hydrochloric acid at 70° to 80° C. for 24 hours, with agitation. A viscous mass resulted, which upon cooling and filtering left a white filter cake which was identified as stearic acid. The filtrate upon evaporation gave 22 parts of residue which upon recrystallization from water resulted in a colorless crystalline solid, soluble in water with an acid reaction and analyzing,

C=10.75%, H=5.0%, P=27.2%, N=12.5%

Theory for $NH_2-CH_2-PO(OH)_2$ is

C=10.8%, H=5.4%, P=27.9%, N=12.6%

This product did not melt up to 300° C.

*Example 2.—Same. Different initial material*

21 parts of methylol acetamide were added slowly to 66 parts of phosphorus trichloride with cooling to keep the temperature below 30° C. The thick syrup which was formed was allowed to stand at room temperature for one week (to allow rearrangement into the phosphone dichloride) and was then dissolved in 50 parts of water whereupon acetamido-methylene phosphonic acid is formed in aqueous solution, while the excess phosphorus trichloride decomposes into phosphonic acid.

10 parts of concentrated hydrochloric acid were added to the above solution, and the reaction mass was then heated to reflux for 24 hours. After this time the solution was evaporated to dryness and the residue was taken up in a small amount of water. Ethyl alcohol was now gradually added, to the point of incipient turbidity. The crystalline product which separated was re- crystallized from hot water, and analyzed: 11.8% N and 27.99% P. The theory for $$NH_2-CH_2-PO(OH)_2$$

requires 12.6% N and 27.9% P.

*Example 3.—Same. Different initial material*

100 parts of the methylene phosphonic acid of stearyl carbamate as prepared according to Example 8 of Engelmann and Pikl Case 1, and having the formula $$C_{18}H_{37}-O-CONH-CH_2-PO(OH)_2$$

were heated with 2000 parts of dilute hydrochloric acid (8% HCl) for 20 hours at 80 to 90° C. The oily top layer was discarded and the aqueous layer was evaporated in vacuo until all the water was removed. The residue yielded upon treatment with dilute alcohol a considerable amount of crystals which had the same properties, and presumably the same constitution, as the product described in Example 1.

*Example 4.—Methylamino-methylene-phosphonic acid*

70 parts of chloromethyl-methyl stearamide (which has been prepared in known manner by reacting methyl stearamide with formaldehyde and hydrogen chloride; see U. S. P. 2,131,362) were dissolved in 200 parts of benzene; 40 parts of dry potassium carbonate were added and the mass was agitated for 24 hours at room temperature. By this time the benzene solution was halogen free. The solvent was evaporated and the residue, which was presumably N-methyl-stearamido-methylol, was added gradually at room temperature to 150 parts of phosphorus trichloride. One hour later, 50 parts of acetic acid were added to the clear thin solution and then allowed to stand at room temperature for one week. The reaction mass gradually changed to a syrup and then to a paste, presumably forming the phosphone dichloride.

After treating the reaction product with dilute hydrochloric acid at temperature below 50° C. in the manner described in Example 1, a cheesy paste was obtained which dissolved in hot water, and more readily in the presence of some basic compound, to a clear solution. This product is presumably methyl-stearamido-methylene-phosphonic acid of the formula $$C_{17}H_{35}-CO-N(CH_3)-CH_2-P(=O)(OH)_2$$

It analyzed: 3.69% nitrogen and 7.76% phosphorus. Calculated for $C_{20}H_{42}O_4NP$: 3.58% nitrogen and 7.73% phosphorus.

This product was hydrolzed by heating it for 24 hours, close to the boil, with 1000 parts of 5% aqueous hydrochloric acid. The aqueous layer was separated from the oily fatty acid, filtered and evaporated in vacuo. The crystalline residue thus obtained was recrystallized from a mixture of water and methyl alcohol. The product did not melt up to 240° C. and analyzed as follows:

C=19.22%, H=6.41%, N=11.2%, P=24.94%

Calculated for $CH_3-NH-CH_2-PO(OH)_2$.

C=19.2%, H=6.4%, N=11.2%, P=24.8%

*Example 5.—Disodium salt of product from Example 1*

22.2 parts of aminomethylene phosphonic acid as obtained in Example 1 were dissolved in water and then 16.0 parts of sodium hydroxide, also dissolved in water, were added. The resulting disodium salt is much more soluble in water than the free acid and crystallizes upon concentrating the solution in large crystals. The entire product was recovered by evaporating the solution to dryness on the water bath.

If in the above example 8.0 parts of sodium hydroxide are used instead of 16, the monosodium salt of aminoethylene phosphonic acid is obtained; this compound is neutral to phenolphthalein and may be isolated as a crystalline, colorless substance by evaporating the aqueous solution. By using 8.0 parts of sodium hydroxide and 11.2 parts of potassium hydroxide, a mixed sodium-potassium salt may be obtained.

Example 6.—Arylation 17.5 parts of the disodium salt obtained in Example 5 were dissolved in 300 parts of water together with 20 parts of sodium carbonate, 0.3 part of copper acetate and 30 parts of the sodium salt of 1-amino-2-sulfo-4-bromo anthraquinone. This mixture was heated for 3 hours close to the boiling point. A gradual change of the color of the solution was observed, from a reddish brown to a violet shade. After the conversion was complete 150 parts of sodium chloride were added and hydrochloric acid, until the solution was acidic to litmus paper, and the mass was then allowed to cool off. 34 parts of a product separated which was extremely soluble in water and also in sodium chloride solution.

The product presumably was 1-amino-2-sulfoanthraquinone-4-imino-methyl-phosphonic acid of the formula

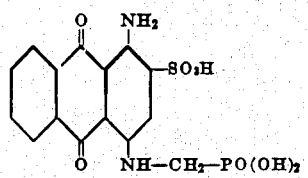

and contained the expected amount of phosphorus for the above formula. It dyed wool from an acid bath in a violet shade.

Example 7.—Acylation 15 parts of the disodium salt of amino methylene phosphonic acid as prepared in the Example 5 were dissolved in 15 parts of water and then 18 parts of stearic acid chloride were added gradually with stirring. A thick homogeneous paste resulted. When all the stearic acid chloride was added, 4 parts of a 30% solution of sodium hydroxide were added, and the mass was thoroughly mixed in and heated for half an hour to 60° C.

The reaction product was recrystallized from alcohol and had the same properties as the stearamidomethyl phosphonic acid described in Example 1. It analyzed: Nitrogen, 3.80%; phosphorus, 8.29%. Calculated for $C_{19}H_{40}O_4NP$: N=3.72%, P=8.2%.

It will be understood that the above examples are merely illustrative and that many variations in the details of procedure are permissible, within the skill of those engaged in this art. Thus, in lieu of stearamido-methylene-phosphonic acid in Examples 1, 2 and 3 above, any other acyl-amido-methylene-phosphonic acid of the formula

may be used, wherein R is any organic radical, for instance alkyl (lower or higher), aralkyl or aryl. Likewise, in lieu of methyl-stearamido-methyl-phosphonic acid named in Example 4, any other secondary acyl-amido-methylene-phosphonic acid may be employed. Thus, starting with the various chloromethyl compounds obtained as final products in the various examples of U. S. P. 2,131,362, the following intermediate and final phosphonic acid compounds may be obtained:

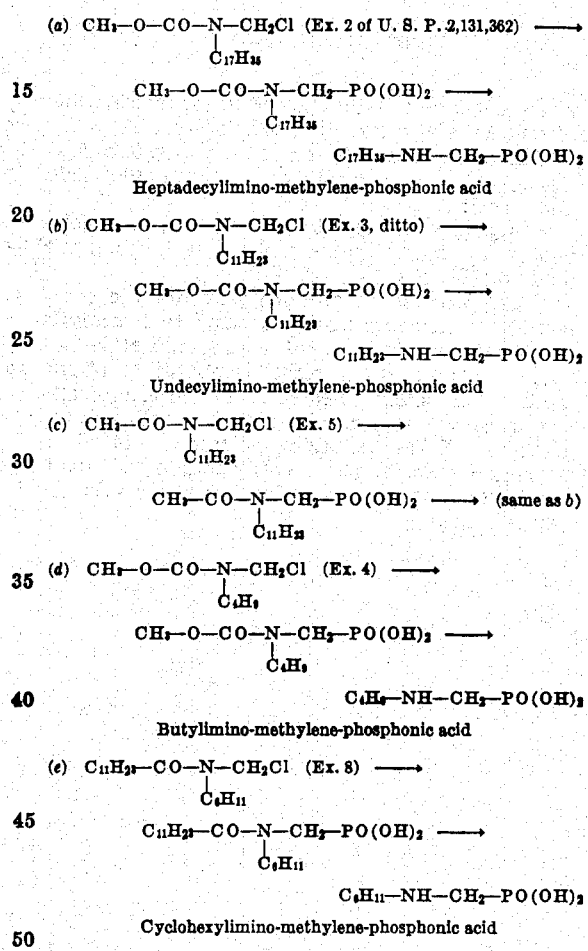

Secondary aminomethylene phosphonic acids may also be prepared by alkylation of the primary amino-compound obtained in Example 1. By alkylation of the secondary amino-compounds, for instance the methylamino-methylene-phosphonic acid obtained in Example 4, tertiary amino-methylene phosphonic acids may be obtained.

By esterifying the OH groups of the phosphonic acid radical with alcohols further novel organic derivatives may be obtained.

I claim:

1. A compound of the group consisting of amino-methylene-phosphonic acid, its N-alkyl, N-aralkyl and N-aryl derivatives, and the normal and acid salts of any of these.

2. A compound of the general formula

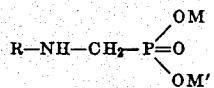

wherein R stands for a member of the group consisting of hydrogen, alkyl, aralkyl, and aryl, while M and M' designate cationic substituents.

3. A compound of the general formula

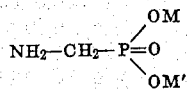

wherein M and M' designate cationic substituents

4. A compound of the general formula

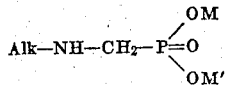

wherein Alk designates a lower alkyl radical, while M and M' stand for cationic substituents.

5. A compound selected from the group consisting of amino-methylene phosphonic acid and its salts.

6. A compound selected from the group consisting of methylamino-methylene phosphonic acid and its salts.

7. The process of producing an organic compound which comprises subjecting to hydrolysis by the aid of mineral acid, at a temperature between 50° C. and the reflux temperature of the mass, a compound selected from the group consisting of the acyl-amido-methylene-phosphonic acids, the N - carbo - alkoxy - amino - methylene phosphonic acids, their corresponding N-alkyl, N-aralkyl and N-aryl derivatives, and salts of any of these.

8. The process of producing an organic compound which comprises subjecting to hydrolysis by the aid of aqueous hydrochloric acid, at a temperature between 50° C. and the reflux temperature of the mass, a compound of the general formula

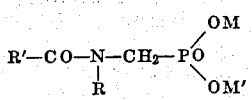

wherein R' stands for a radical selected from the group consisting of alkyl and alkoxy; R designates a member selected from the group consisting of hydrogen, alkyl, aralkyl and aryl; while M and M' stand for cationic substituents.

9. The process of producing amino-methylene-phosphonic acid, which comprises subjecting to hydrolysis by the aid of aqueous hydrochloric acid, at a temperature between 50° C. and the reflux temperature of the mass, a compound of the general formula

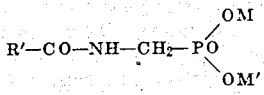

wherein R' stands for a radical selected from the group consisting of alkyl and alkoxy, while M and M' represent cationic substituents.

JOSEF PIKL.